(12) United States Patent
Stroh

(10) Patent No.: US 10,151,257 B2
(45) Date of Patent: Dec. 11, 2018

(54) SYSTEMS AND METHODS TO REDUCE TORSIONAL CONDITIONS IN AN INTERNAL COMBUSTION ENGINE

(71) Applicant: Cummins Inc., Columbus, IN (US)

(72) Inventor: David J. Stroh, Columbus, IN (US)

(73) Assignee: Cummins Inc., Columbus, IN (US)

( * ) Notice: Subject to any disclaimer, the term of this patent is extended or adjusted under 35 U.S.C. 154(b) by 129 days.

(21) Appl. No.: 15/425,425

(22) Filed: Feb. 6, 2017

(65) Prior Publication Data

US 2017/0145935 A1 May 25, 2017

Related U.S. Application Data

(62) Division of application No. 14/197,925, filed on Mar. 5, 2014, now Pat. No. 9,587,572.

(51) Int. Cl.

| F02B 47/08 | (2006.01) |
| G06F 19/00 | (2018.01) |
| F02D 41/00 | (2006.01) |
| F02D 41/14 | (2006.01) |
| F02N 11/08 | (2006.01) |
| F02P 5/15  | (2006.01) |

(52) U.S. Cl.
CPC ..... *F02D 41/0085* (2013.01); *F02D 41/0002* (2013.01); *F02D 41/0077* (2013.01); *F02D 41/1448* (2013.01); *F02D 41/1497* (2013.01); *F02N 11/0814* (2013.01); *F02D 41/0072* (2013.01); *F02D 2041/001* (2013.01); *F02D 2200/0406* (2013.01); *F02D 2200/1004* (2013.01); *F02D 2200/1006* (2013.01); *F02P 5/1512* (2013.01); *Y02T 10/48* (2013.01)

(58) Field of Classification Search
CPC ............. F02D 41/0085; F02D 41/0002; F02D 41/0077; F02D 41/1448; F02D 41/1497; F02D 41/0072; F02D 2041/001; F02D 2200/0406; F02D 2200/1004; F02D 2200/1006; F02N 11/0814; F02P 5/1512
USPC .......................... 123/568.18, 406.23, 406.48
See application file for complete search history.

(56) References Cited

U.S. PATENT DOCUMENTS

| 6,024,070 | A   |   | 2/2000  | May et al.     |             |
|-----------|-----|---|---------|----------------|-------------|
| 7,500,470 | B2  |   | 3/2009  | Buslepp et al. |             |
| 7,654,248 | B2  |   | 2/2010  | Buslepp et al. |             |
| 7,823,563 | B2  |   | 11/2010 | Jankovic et al.|             |
| 8,291,891 | B2  | * | 10/2012 | Alger, II      | F02D 13/0238 |
|           |     |   |         |                | 123/315     |
| 2005/0075212 | A1 | * | 4/2005  | Yang           | B60W 10/06  |
|           |     |   |         |                | 477/107     |
| 2012/0204844 | A1 | * | 8/2012  | Gingrich       | F02B 27/0215 |
|           |     |   |         |                | 123/568.11  |
| 2013/0245921 | A1 | * | 9/2013  | Glugla         | F02D 41/0085 |
|           |     |   |         |                | 701/105     |

* cited by examiner

Primary Examiner — Syed O Hasan
(74) Attorney, Agent, or Firm — Taft Stettinius & Hollister LLP

(57) ABSTRACT

An internal combustion engine includes a number of cylinders and a controller operably connected to interpret operating parameters related to the operation of the number of cylinders. A cylinder torque adjustment for each cylinder is determined from the operating parameters to provide a torque balancing response that reduces noise, vibration and/or harshness in engine operation.

7 Claims, 4 Drawing Sheets

SYSTEMS AND METHODS TO REDUCE TORSIONAL CONDITIONS IN AN INTERNAL COMBUSTION ENGINE

RELATED APPLICATIONS

This application is a divisional of U.S. patent application Ser. No. 14/197,925 entitled SYSTEMS AND METHODS TO REDUCE TORSIONAL CONDITIONS IN AN INTERNAL COMBUSTION ENGINE filed on Mar. 5, 2014 of which it is incorporated herein by reference for all purposes

BACKGROUND

Internal combustion engines are known that include a plurality of cylinders that receive a charge flow for combustion in an air-fuel mixture. Modern engine design and controls can result in cylinder-to-cylinder variation in cylinder breathing, pumping work and other conditions that lead to cylinder torque imbalance and undesired noise, vibration and/or harshness. For example, some engines include a dedicated exhaust gas recirculation (EGR) system that creates an imbalance in cylinder breathing conditions. Engines may also use cylinder deactivation or other techniques that cause cylinder-cylinder variation which create torque imbalances.

Existing techniques for addressing torque imbalance include those that use a speed signal for feedback control of the engine torque. However, these techniques suffer from the poor signal to noise ratio from the speed signal. Therefore, further improvements in this technology area are needed.

SUMMARY

One embodiment is a unique system that includes an internal combustion engine with a number of cylinders and a controller operably connected to interpret operating parameters related to the operation of the number of cylinders. The controller is configured to determine a cylinder torque adjustment for each cylinder from the operating parameters to provide a torque balancing response that reduces noise, vibration and/or harshness in engine operation. Other embodiments include unique methods and apparatus for determining a cylinder torque adjustment from the operating parameters of each cylinder to provide a torque balancing response for each cylinder.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1A:
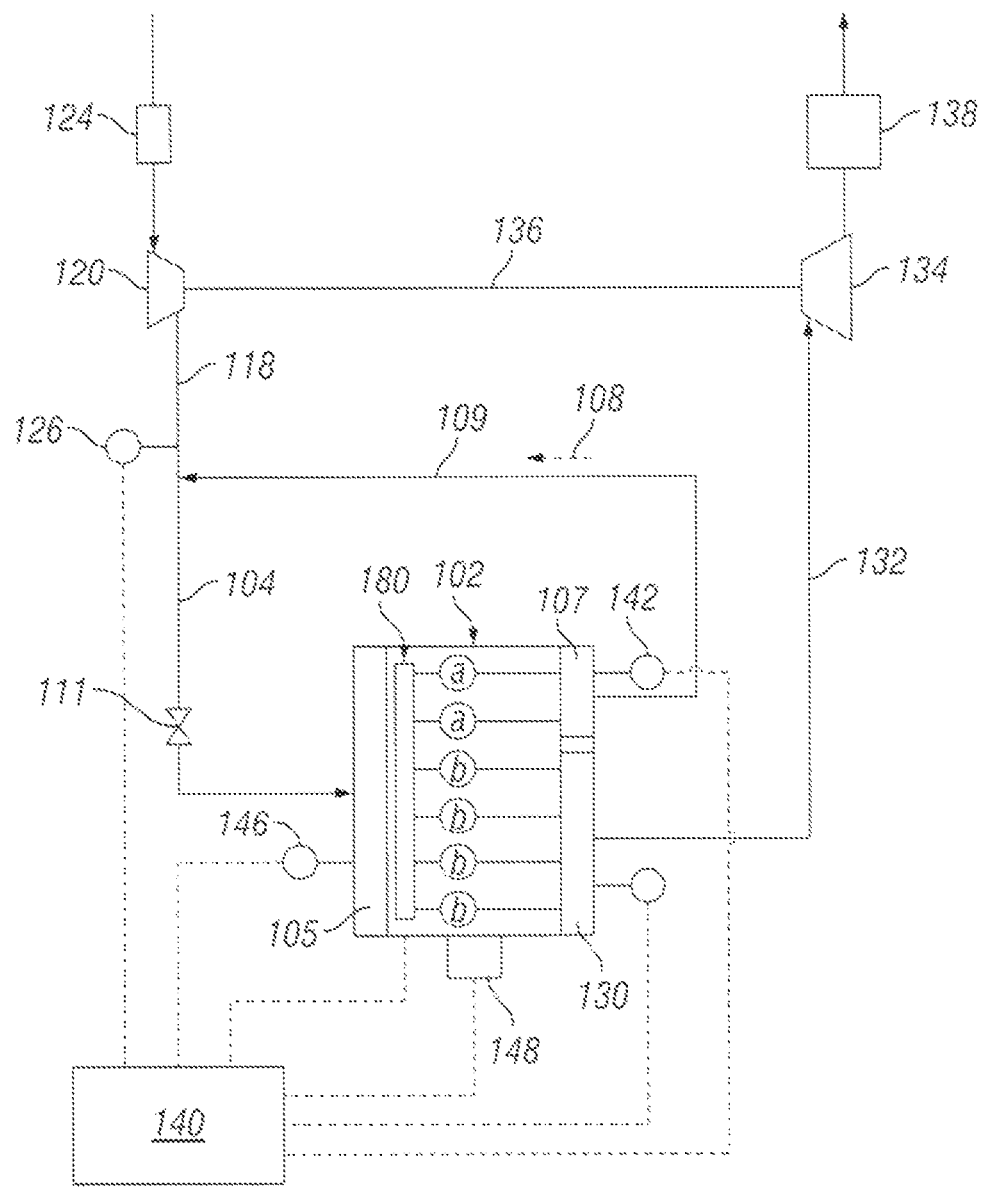
FIG. 1A is a schematic depiction of one embodiment of a system having an internal combustion engine.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1A, a system 100 is depicted having an engine 102. The engine 102 is an internal combustion engine of any type, and can include a stoichiometric engine, a gasoline engine, a diesel engine, and/or a natural gas engine. In certain embodiments, the engine 102 includes a lean combustion engine such as a lean burn gasoline or natural gas engine. In certain embodiments, the engine 102 may be any engine type producing emissions that may include an exhaust gas recirculation (EGR) system, for example to reduce $NO_x$ emissions from the engine 102. The engine 102 includes a number of cylinders a, b. The system 100 includes an inline 6 cylinder arrangement for illustration only. The number of cylinders may be any number suitable for an engine, and the arrangement may be any suitable arrangement. The example engine 102 may further include an ignition source such as a spark plug in certain embodiments.

In certain embodiments, the engine 102 is provided as a spark-ignition internal combustion engine, configured to develop mechanical power from internal combustion of a stoichiometric mixture of fuel and induction gas. As used herein, the phrase "induction gas" may include fresh air, recirculated exhaust gases, or the like, or any combination thereof. The intake manifold 105 receives induction gas from the intake passage 104 and distributes the induction gas to combustion chambers of cylinders a, b of the engine 102. Accordingly, an inlet of the intake manifold 105 is disposed downstream of an outlet of the intake passage 104, and an outlet of the intake manifold 105 is disposed upstream of an inlet of each of the combustion chambers in engine 102.

During operation of engine 102, each of the cylinders a, b operates by combusting fuel in response to a fuelling command and spark/ignition timing to produce a torque output to satisfy a torque request or torque demand. In certain arrangements and operating conditions, the induction gas properties, amounts, constituents, etc. vary from one cylinder to the next. Therefore, the actual torque output may vary from cylinder-to-cylinder, resulting in a torque imbalance. The present disclosure includes a controller 140 configured to determine a net torque output of each cylinder, determine a base torque from the net torque outputs, and to provide a torque balancing command to adjust the torque output of each of the cylinders a, b in response to the base torque and the net torque output, thereby reducing noise, vibration and/or harshness during operation of engine 102.

A first exhaust manifold 130 collects exhaust gases from combustion chambers of cylinders a of the engine 10 and conveys the exhaust gases to the exhaust passage 132, and a second exhaust or EGR manifold 107 collects exhaust gases from combustion chambers of cylinders b of the engine 102 and conveys the exhaust gases to EGR passage 109. Accordingly, inlets of the exhaust manifolds 107, 130 are disposed downstream of an outlet of each of the combustion chambers in engine 102, and upstream of inlets to the respective EGR passage 109 and exhaust passage 132.

Injectors may also be arranged within the engine 102 to deliver fuel directly or indirectly into the combustion chamber of cylinders a, b with a fuel delivery system 150 structured to deliver fuel to the engine 102, such as shown in FIG. 1A. The fuel delivery system 150 can include, for example, a fuel tank 152 and fuel pump 154 that is configured to deliver a fuel such as gasoline to the engine 102. In another embodiment, the fuel delivery system can be configured to deliver another type of fuel, in addition to gasoline, to the engine 102. Examples of such additional fuels include diesel (or other high cetane fuels), natural gas, ethanol, and the like. In one embodiment, the fuel delivery system 150 may include one or more injectors 158 configured to inject fuel into the engine 102 so the fuel may be combusted within a combustion chamber of the respective cylinder a, b by a spark from spark plug 160. Example injectors include direct injectors as shown and/or port injectors.

In the illustrated embodiment, engine 102 includes a plurality of cylinders b, and other or remaining cylinders that are primary EGR cylinders a. Cylinders a can be completely flow isolated from the EGR system or connected to provide at least some exhaust flow to the EGR system and/or to receive at least some exhaust flow from the EGR system under certain operating conditions. The term primary EGR, as utilized herein, should be read broadly. Any EGR arrangement wherein, during at least certain operating conditions, the entire exhaust output of the cylinder is recirculated to the engine intake is a primary EGR cylinder. A primary EGR cylinder typically, at least during primary EGR operation, provides recirculated exhaust gas that is divided amongst one or more, or all, of the cylinders a, b.

In the system 100, the EGR flow 108 recirculates in EGR passage 109 and combines with intake flow 118 at a position upstream of intake manifold 105. Intake manifold 105 provides a charge flow including the intake flow 118 combined with EGR flow 108. Intake manifold 105 is connected to intake passage 104 that includes an intake throttle 111 to regulate the charge flow to cylinders a, b. Intake passage 104 may also include a charge air cooler (not shown) to cool the charge flow provided to intake manifold 105. Intake passage 104 also includes a compressor 120 to compress the intake air flow received from an intake air cleaner 124. In other embodiments, intake manifold 105 includes first and second portions divided relative to primary EGR cylinders a and non-primary EGR cylinders b.

The EGR flow 108 may combine with the intake flow 118 at an outlet of a restriction in EGR passage 109 through, for example, a mixer, an accumulator, or by any other arrangement. In certain embodiments, the EGR flow 108 returns to the intake manifold 105 directly. In other embodiments, the EGR system may be a low-pressure loop, for example returning to the intake at a position upstream of a compressor 120. In the illustrated embodiment, the EGR system forms a high-pressure loop, for example, by returning to the intake at a position downstream of compressor 120 and/or at the intake manifold 105. In certain embodiments, the system 100 does not include a compressor or any other type of boost pressure generating device. In other examples, system 100 includes an EGR cooler in the EGR passage 109. In other embodiments, EGR passage 109 can include a bypass and bypass valve that selectively allows EGR flow to bypass the EGR cooler. The presence or absence of an EGR cooler and/or an EGR cooler bypass is optional and non-limiting.

Non-primary EGR cylinder(s) a are connected to an exhaust system that includes exhaust manifold 130 that receives exhaust gases from non-primary EGR cylinders b, exhaust passage 132 that receives exhaust gas from exhaust manifold 130, and a turbine 134 in exhaust passage 132 that is operable via the exhaust gases to drive compressor 120 via a rod, shaft 136 or the like. Turbine 134 can be a variable geometry turbine with an adjustable inlet, or include a wastegate to bypass exhaust flow. It will be appreciated, however, that the turbocharger may be provided in any other suitable manner (e.g., as a multi-stage turbocharger, or the like), and may be provided with or without a wastegate and/or bypass. Other embodiments contemplate an exhaust throttle (not shown) in the exhaust system.

The exhaust passage 132 can further include an aftertreatment system 138 in exhaust passage 132 that is configured to treat emissions in the exhaust gas. Aftertreatment system 138 can include any aftertreatment components known in the art. Example aftertreatment components treat carbon monoxide (CO), unburned hydrocarbons (HC), nitrogen oxides ($NO_x$), volatile organic compounds (VOC), and/or particulate matter (PM).

Figure 1B:
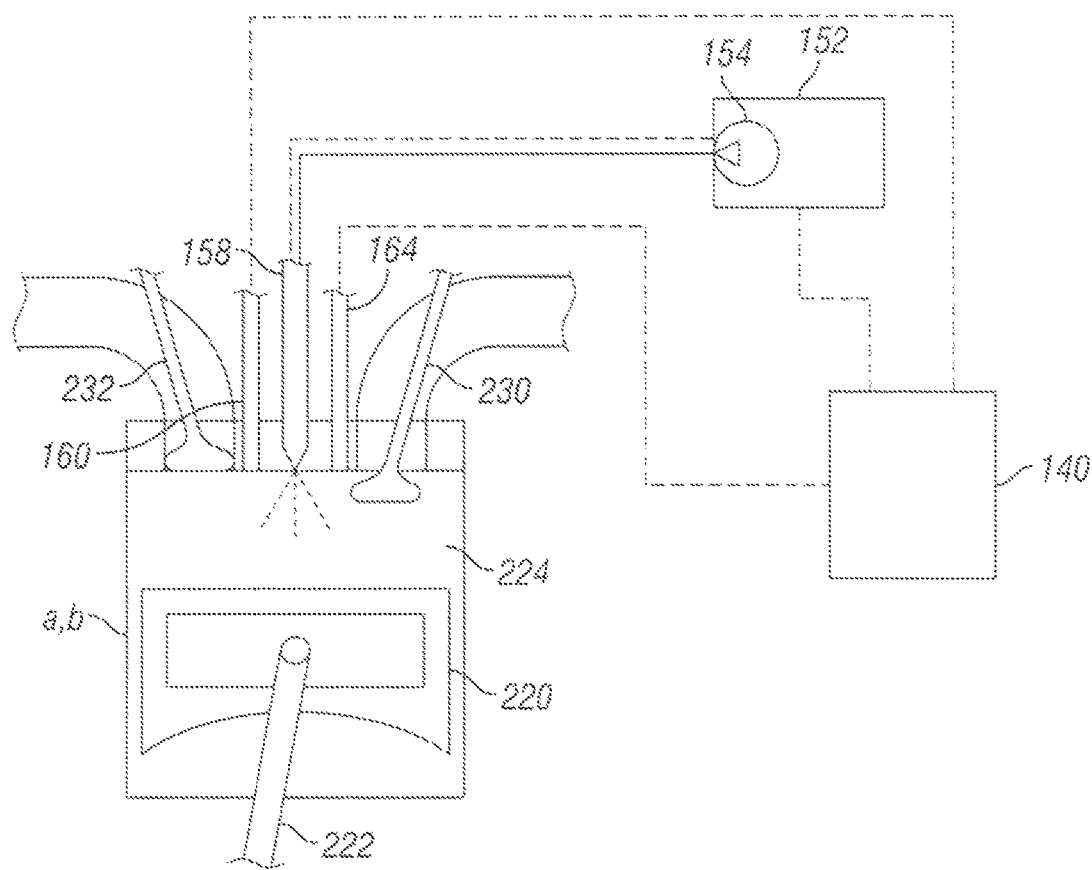
FIG. 1B is a schematic depiction of one embodiment of a cylinder of the internal combustion engine of FIG. 1A.

As shown further in FIG. 1B, cylinders a, b include a piston 220 connected to a crank 222. Piston 220 moves in combustion chamber 224 between a top dead center (TDC) position and a bottom dead center (BDC) position. Cylinder a, b, includes at least one exhaust valve 230 and at least one intake valve 232 that are operable to selectively open and close an intake port and exhaust port, respectively, in fluid communication with combustion chamber 224. A direct injector 158 is also shown for directing fuel from fuel source 152 directly into combustion chamber 224 in a predetermined pulse amount, width, duration, timing and number of pulses in response to a fuelling command from a controller. Cylinder a, b also includes a spark plug 160 that ignites the air/fuel mixture in combustion chamber 224 according a spark timing command that times ignition relative the position of piston 220 in combustion chamber 224. In one embodiment, a cylinder pressure sensor 164 is connected to cylinder a, b and configured to provide a pressure measurement indicative of the indicated mean effective pressure (IMEP) of the cylinder a, b to controller 140. Direct injector 158, spark plug 160, and/or pressure sensor 164 can be connected to controller 140 to provide outputs to controller 140 and/or to receive commands from controller 140. In one embodiment, a retarding of the sparking timing is employed on a cylinder-by-cylinder basis in response to a torque imbalance.

System 100 may further includes a variable valve actuation mechanism 180 connected to the exhaust and/or intake valves 230, 232 of cylinders a, b of engine 102. Variable valve actuation mechanism 180 is connected to and operable by control commands from a controller 140 in response to operating conditions. Variable valve actuation mechanism 180 is connected to the intake valves 232 and/or exhaust valves 230 of cylinders a, b to control the lift, timing, profile and/or duration of the exhaust valve 230 and/or intake valve 232 opening and closing. Variable valve actuation mechanism 180 may be of any type, and may include, without limitation, controlling the opening and/or closing of the exhaust valve 230 and/or intake valve 232 to provide cylinder-by-cylinder valve actuation adjustments in response to a torque imbalance between cylinders a, b. Other embodiments contemplate a variable valve actuation mechanism that provides adjustment of individual cylinder valve lift profiles in response to torque imbalances. In still other embodiments, static compensation for cylinder-by-cylinder torque control can be achieved by uniquely machining a cam shaft so that each cam lobe is adjusted to compensate for a global torque imbalance across all operating conditions in response to an operating point dependent variation.

In certain embodiments, the system 100 includes controller 140 structured to perform certain operations to determine a torque imbalance condition of engine 102 and provide a torque balancing command to control the torque output of cylinders a, b. In certain embodiments, the controller 140 forms a portion of a processing subsystem including one or more computing devices having memory, processing, and communication hardware. The controller 140 may be a single device or a distributed device, and the functions of the controller 140 may be performed by hardware or software. The controller 140 may be included within, partially included within, or completely separated from an engine controller (not shown).

The controller 140 is in communication with any sensor or actuator throughout the system 100, including through direct communication, communication over a datalink, and/or through communication with other controllers or portions of the processing subsystem that provide sensor and/or actuator information to the controller 140. In the illustrated embodiment, controller 140 is connected an intake air mass flow sensor 126, fuel system 150, variable valve actuation mechanism 180, EGR manifold pressure sensor 142, exhaust manifold pressure sensor 144, intake manifold pressure sensor 146, engine sensors 148, and cylinder pressure sensor 164. Engine sensors 148 may include, for example, an engine speed sensor, an O2 sensor, and any sensors operable to provide an output of an engine operating parameter. Any of the sensors discussed herein may be real or virtual, or provide outputs derived from one or more inputs.

Example parameters related to the operation of the engine 102 include any parameters that affect or can be correlated to the indicated torque and pumping torque of cylinders a, b. Further example and non-limiting parameters related to the operation of the engine 102 include an induction gas temperature at the intake passage 104, an induction gas temperature at the intake manifold 105 and/or at each cylinder a and b, an induction gas pressure at the intake manifold 105 and/or at each cylinder a and b, an exhaust gas temperature at the exhaust manifold 130 and/or at each cylinder b, an exhaust gas pressure at the exhaust manifold 130 and/or at each cylinder b, an exhaust gas temperature at the inlet and/or outlet of the exhaust passage 132, an exhaust gas pressure at the inlet and/or outlet of the exhaust passage 132, an exhaust gas temperature at EGR manifold 107 and/or at each cylinder a, and exhaust gas temperature at the inlet and/or outlet of the EGR passage 109, an exhaust gas pressure at EGR manifold 107 and/or at each cylinder a, an exhaust gas pressure at the inlet and/or outlet of the EGR passage 109, a lift, duration and/or timing of an intake valve and/or an exhaust valve of cylinders a, b, a rate of fuel injection, a type of fuel injected, a speed of compressor 120, a geometry or position of the turbine 134, a composition of induction gas and/or EGR gas, an engine speed value, an engine load, engine or cylinder torque, engine or cylinder power output value, and/or combinations thereof. Additionally or alternatively, an example parameter includes a rate of change or other transformation of any described parameter. The illustrative parameters are example and non-limiting.

In certain embodiments, the controller 140 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors as discussed above providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

In certain embodiments, the controller 140 provides an engine control command, and one or more components of the engine system 100 are responsive to the engine control command. The engine control command, in certain embodiments, includes one or more messages, and/or includes one or more parameters structured to provide instructions to the various engine components responsive to the engine control command. An engine component responding to the engine control command may follow the command, receive the command as a competing instruction with other command inputs, utilize the command as a target value or a limit value, and/or progress in a controlled manner toward a response consistent with the engine control command.

Figure 2:
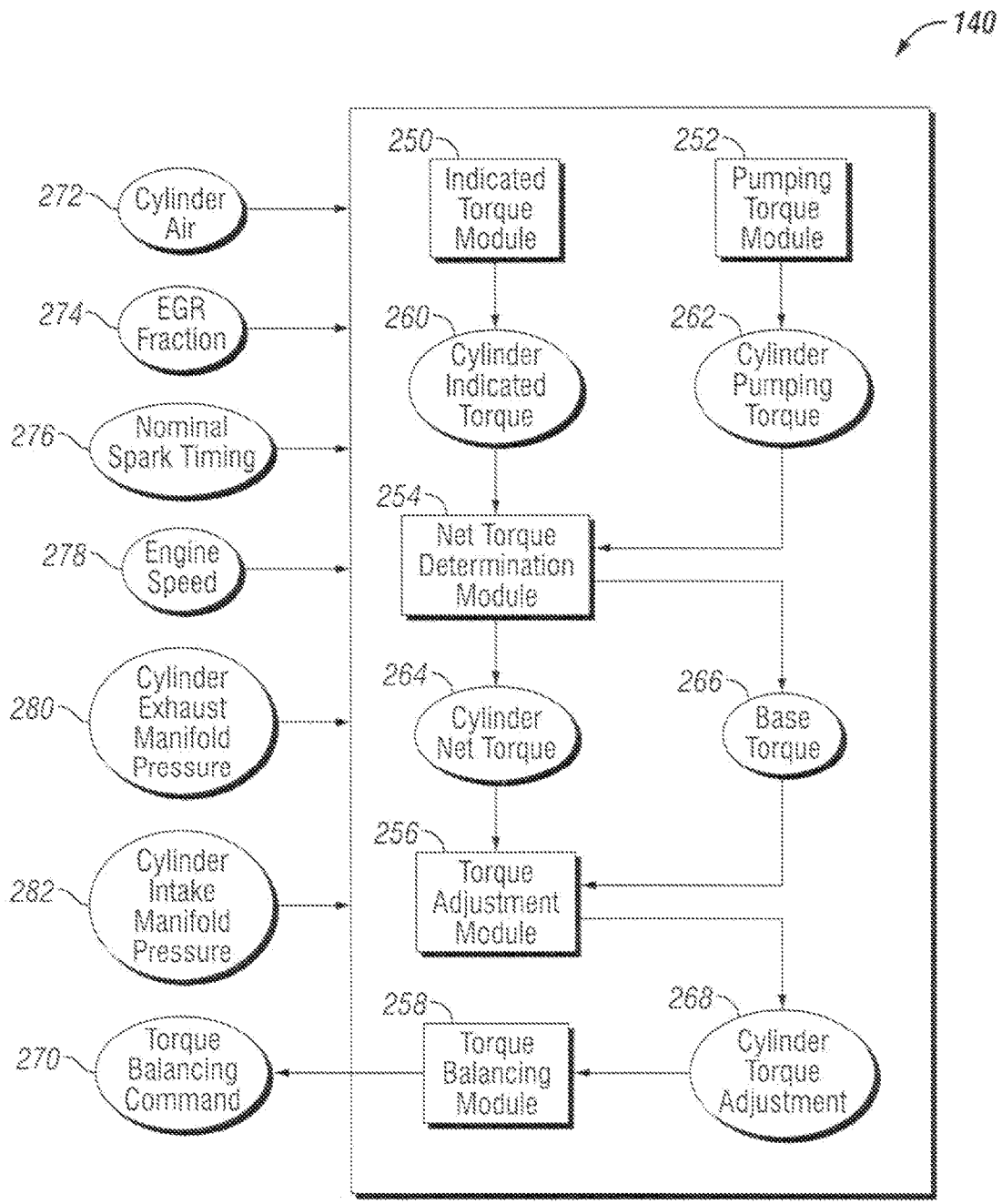
FIG. 2 is a schematic diagram of controller configured to reduce torque imbalance during operation of an internal combustion engine.
Figure 3:
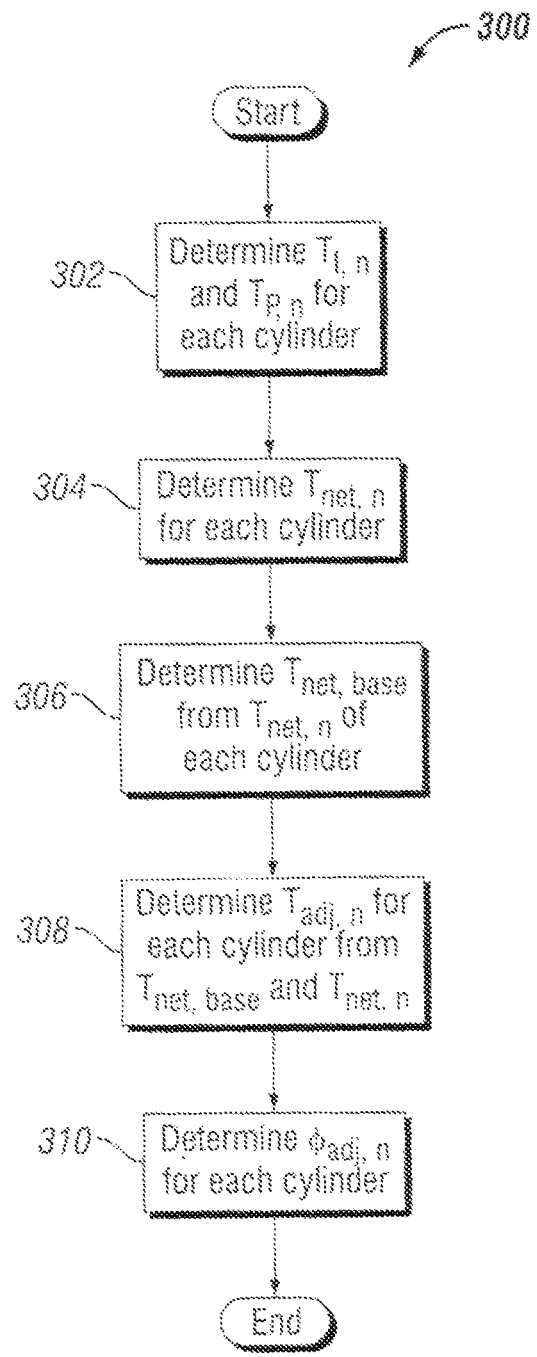
FIG. 3 is a flow diagram of a procedure for reducing torque imbalance during operation of an internal combustion engine.

One embodiment of controller 140 is shown in FIG. 2. Controller 140 includes an indicated torque module 250 configured to determine a cylinder indicated torque 260 for each cylinder a and b and a pumping torque module 252 configured to determine a cylinder pumping torque 262 for each cylinder a and b. Controller 140 also includes a net torque determination module 254 configured to determine a cylinder net torque 264 for each cylinder and a base torque 266. Controller 140 further includes torque adjustment module 256 configured to determine a cylinder torque adjustment 268 for each cylinder a and b in response to the base torque 266 and each cylinder net torque 264. Controller 140 also includes a torque balancing module 258 that is configured to determine a torque balancing command in response to cylinder torque adjustment 268.

In one embodiment, indicated torque module 250 receives inputs of cylinder air 272, EGR fraction 274, nominal spark timing 276, and engine speed 278 to determine cylinder indicated mean torque 260 for each cylinder a and b. Cylinder air 272 can include an indication or measurement of, for example, the amount of air trapped in the cylinder a, b by measuring or determining the fresh air flow amount in the charge flow. In one embodiment, the fresh air flow is determined or estimated from a mass air flow sensor. EGR fraction 274 can include the fraction or percentage of EGR flow comprising the charge flow the cylinder a, b. In one embodiment, the EGR fraction is known under certain operating conditions from the number of primary EGR cylinders relative to the total number of cylinders. In other embodiments, the EGR fraction is determined by determining the difference between the charge flow and the intake or fresh air flow. Using these inputs, indicated torque module 250 determines an expected torque output for each cylinder corresponding to cylinder indicated torque 260.

Pumping torque module 252 receives inputs of a cylinder exhaust manifold pressure 280 and a cylinder intake manifold pressure 282 of each cylinder a, b and engine speed 278. Pumping torque module 252 is configured to determine an actual torque output for each cylinder corresponding to cylinder pumping torque 262. In another embodiment, the pumping torque is determined from an IMEP measurement in each cylinder a, b.

Net torque determination module 254 receives inputs of cylinder indicated torque 260 and cylinder pumping torque 262 for each cylinder a and b. The net torque 264 for each cylinder a and b is determined from the difference between the cylinder indicated torque 260 and cylinder pumping torque 262. Net torque determination module 254 is further configured to determine the base torque 266 from the cylinder net torque 264 outputs. In one embodiment, base torque 266 is a minimum of the cylinder net torque 264 outputs. Other embodiments contemplate a base torque 266 that is an average of the cylinder net torques, or other suitable function of current and/or prior cylinder base torque outputs.

Torque adjustment module 256 receives base torque 266 and cylinder net torque 264 for each cylinder a, b and determines cylinder torque adjustment 268 for each cylinder a and b. In one embodiment, cylinder torque adjustment 268 is an amount of torque adjustment that would need to be applied to each cylinder so that the net torque output for each cylinder corresponds to the base torque 266.

Torque balancing module 258 receives cylinder torque adjustment 268 for each cylinder a, b and outputs torque balancing command 270 that balances the net torque outputs from cylinders a and b to reduce noise, vibration and/or harshness during operation of engine 102. In one embodiment, torque balancing command 270 retards the sparking timing of each of cylinders a and b as needed to achieve the cylinder torque adjustment 268. Other embodiments contemplate a torque balancing command that controls the effective compression ratio of one or more the cylinders by, for example, controlling the actuation of the exhaust and/or intake valves 230, 232 of cylinders a and b on a cylinder-by-cylinder with variable valve actuation mechanism 180 to balance the torque outputs from cylinders a and b, or by cylinder adjustable valve lift control with cylinder-by-cylinder valve lift adjustments.

Still other embodiments contemplate a torque balancing command 270 that controls an alternator connected to engine 102 to dampen torque pulsations with alternator load control in which the load of the alternator is adjusted up or down in response to the cylinder torque adjustment for each cylinder a and b. In another embodiment, torque balancing command 270 controls a motor that is connected to engine 102 in a hybrid system or start/stop system to compensate for the torsional disturbances. In still another embodiment, engine 102 is secured to the chassis of a vehicle with active engine mounts and a mechanical torque transfer module activates the engine mounts in conjunction with net torque adjustments for each cylinder to dampen vibrations from the torque imbalance. In still other embodiments, static compensation for torque imbalances can be achieved by uniquely machining each cam lobe of a cam shaft to adjust for a global torque imbalance across all operating conditions.

The schematic flow descriptions which follow provide an illustrative embodiment of performing procedures for controlling torque balancing on a cylinder-to-cylinder basis in response to a torque imbalance condition. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

In one embodiment, procedure 300 starts at, for example, a key-on or engine start event and includes performing an operation 302 to determine an indicated torque $T_{i,n}$ for each cylinder a and b and a pumping torque $T_{p,n}$ for each cylinder a and b. Procedure 300 continues at operation 304 to determine a net torque $T_{net,n}$ for each cylinder a and b by determining the difference between $T_{p,n}$ and $T_{i,n}$. Procedure 300 continues at operation 306 to determine net torque $T_{net,n}$ for each cylinder a and b, and a net base torque $T_{net,base}$. Procedure 300 continues at operation 308 to determine an adjusted torque $T_{adj,n}$ for each cylinder a and b from the difference between $T_{net,base}$ and each cylinder $T_{net,n}$. Procedure 300 continues at operation 310 to determine a torque adjustment command that adjusts the operation engine system 100 to balance the torque outputs from cylinders a and b to reduce noise, vibration and/or harshness of engine 102.

Various aspects of the systems and methods disclosed herein are contemplated. According to one aspect, a system includes an internal combustion engine having a plurality of cylinders that receive a charge flow from an intake manifold. At least one of the plurality of cylinders is a primary EGR cylinder connected to an EGR manifold that is flow connected to the intake manifold, and remaining ones of the plurality of cylinders are in flow communication with an exhaust manifold that is flow connected to an exhaust passage that emits exhaust gas from the remaining ones of the plurality of cylinders. The system also includes a controller operably connected to the internal combustion to receive a plurality of operating parameters associated with operation of the plurality of cylinders. The controller is configured to determine a net torque output of each of the plurality of cylinders, a base net torque output from the net torque outputs of the plurality of cylinders, a torque adjustment for each of the plurality cylinders as a function of the base net torque output and the net torque output of the respective cylinder, and reduce a torque imbalance of the internal combustion engine in response to the torque adjustment for each of the plurality of cylinders.

In one embodiment, the net torque output is determined from a difference between an indicated torque and a pumping torque of the respective cylinder. In a refinement of this embodiment, the indicated torque for each cylinder is determined as a function of an air amount in the cylinder, a fraction of recirculated exhaust gas in the charge flow to the cylinder, a nominal spark timing of the cylinder, and an engine speed. In another refinement of this embodiment, the pumping torque for each cylinder is determined as a function of an exhaust manifold pressure of the cylinder, an intake manifold pressure of the cylinder, and an engine speed.

In another embodiment, the controller is configured to reduce the torque imbalance by retarding a spark timing for each of the plurality of cylinders as a function of the torque adjustment for the respective cylinder. In yet another embodiment, the controller is configured to reduce the torque imbalance by reducing an effective compression ratio of each of the plurality of cylinders as a function of the torque adjustment for the respective cylinder. In a further embodiment, the controller is configured to reduce the torque imbalance by adjusting a load on the engine in response to the torque adjustments for the plurality of cylinders.

According to another aspect, a system includes an internal combustion engine having a plurality of cylinders that receive a charge flow from an intake manifold and produce an exhaust gas to an exhaust manifold during operation of the internal combustion engine. The system also includes a plurality of sensors connected with the internal combustion engine. The plurality of sensors are operable to output a plurality of signals associated with operation of the internal combustion engine, including at least an engine speed, an air amount in each cylinder, a nominal spark timing of each cylinder, an exhaust manifold pressure of each cylinder, and an intake manifold pressure of each cylinder. The system also includes a controller operably connected to the plurality of sensors to receive the plurality of signals associated with operation of the plurality of cylinders. The controller is configured to determine a net torque output of each of the plurality of cylinders from a difference between an indicated torque of each cylinder and a pumping torque of each cylinder, a base net torque output from the net torque outputs of the plurality of cylinders, a torque adjustment for each of the plurality cylinders as a function of the base net torque output and the net torque output of the respective cylinder, and reduce a torque imbalance of the internal combustion engine in response to the torque adjustment for each of the plurality of cylinders.

In one embodiment, at least one of the plurality of cylinders is a primary EGR cylinder that is in flow communication with an EGR manifold. In a refinement of this embodiment, the indicated torque for each cylinder is determined as a function of the air amount in the cylinder, a fraction of recirculated exhaust gas in the charge flow to the cylinder, the nominal spark timing of the cylinder, and the engine speed. In another refinement, the pumping torque for each cylinder is determined as a function of the exhaust manifold pressure of the cylinder, the intake manifold pressure of the cylinder, and the engine speed. In yet another embodiment, the controller is configured to reduce the torque imbalance by retarding a spark timing for each of the plurality of cylinders as a function of the torque adjustment for the respective cylinder.

According to another aspect, a method includes operating an internal combustion engine having a plurality of cylinders; determining an indicated torque for each of the plurality of cylinders; determining a pumping torque for each of the plurality of cylinders; determining a net torque for each of the plurality of cylinder from a difference between the indicated torque and the pumping torque; determining a base torque from the net torques of the plurality of cylinders; determining a torque adjustment for each of the plurality of cylinders as a function of the net torque for the cylinder and the base torque; and controlling a torque output of each of the plurality of cylinders in response to the torque adjustment for each of the plurality of cylinders.

In one embodiment, the method further includes outputting exhaust gas from at least one primary EGR cylinder to an EGR manifold connected to the at least one primary EGR cylinder and to an intake passage of the internal combustion engine, and outputting exhaust gas from remaining ones of the plurality of cylinders to an exhaust manifold connected to an exhaust system. In one refinement of this embodiment, the indicated torque for each cylinder is determined as a function of a speed of the internal combustion engine, a fraction of exhaust gas in a charge flow to the cylinder, a nominal spark timing of the cylinder, and an air amount in the cylinder. In a further refinement, the pumping torque for each cylinder is determined as a function of the speed of the internal combustion engine, an intake manifold pressure of the cylinder, and an exhaust manifold pressure of the cylinder.

In another embodiment of the method, controlling the torque output includes adjusting a spark timing of each of the plurality of cylinders in response to the torque adjustment of the cylinder. In yet another embodiment, controlling the torque output includes adjusting an electrical load of each of the plurality of cylinders in response to the torque adjustment of the cylinder. In a further embodiment, controlling the torque output includes operating a motor connected to the internal combustion engine in response to the torque adjustment of the cylinder. In another embodiment, the base torque is a minimum of the torque adjustments of the plurality of cylinders.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising: operating an internal combustion engine having a plurality of cylinders; determining an indicated torque for each of the plurality of cylinders as a function of a speed of the internal combustion engine, a fraction of exhaust gas in a charge flow to the cylinder, a nominal spark timing of the cylinder, and an air amount in the cylinder; determining a pumping torque for each of the plurality of cylinders as a function of the speed of the internal combustion engine, an intake manifold pressure of the cylinder, and an exhaust manifold pressure of the cylinder; determining a net torque for each of the plurality of cylinder from a difference between the indicated torque and the pumping torque; determining a base torque from the net torques of the plurality of cylinders, wherein the base torque is a minimum of the torque adjustments of the plurality of cylinders; determining a torque adjustment for each of the plurality of cylinders as a function of the net torque for the cylinder and the base torque; and controlling a torque output of each of the plurality of cylinders by adjusting a spark timing of each of the plurality of cylinders in response to the torque adjustment for each of the plurality of cylinders.

2. The method of claim 1, further comprising:
outputting exhaust gas from at least one primary exhaust gas recirculation (EGR) cylinder to an EGR manifold connected to the at least one primary EGR cylinder and to an intake passage of the internal combustion engine; and
outputting exhaust gas from remaining ones of the plurality of cylinders to an exhaust manifold connected to an exhaust system.

3. The method of claim 1, wherein controlling the torque output includes reducing a torque imbalance of the internal combustion engine by retarding a spark timing for each of the plurality of cylinders based on the torque adjustment for the respective cylinder.

4. The method of claim 1, wherein controlling the torque output includes reducing a torque imbalance of the internal combustion engine by reducing an effective compression ratio of each of the plurality of cylinders based on the torque adjustment for the respective cylinder.

5. The method of claim 1, wherein controlling the torque output includes reducing a torque imbalance of the internal combustion engine by adjusting a load on the internal combustion engine in response to the torque adjustments for the plurality of cylinders.

6. A method, comprising: operating an internal combustion engine having a plurality of cylinders; determining an indicated torque for each of the plurality of cylinders as a function of a speed of the internal combustion engine, a fraction of exhaust gas in a charge flow to the cylinder, a nominal spark timing of the cylinder, and an air amount in the cylinder; determining a pumping torque for each of the plurality of cylinders as a function of the speed of the internal combustion engine, an intake manifold pressure of the cylinder, and an exhaust manifold pressure of the cylinder; determining a net torque for each of the plurality of cylinder from a difference between the indicated torque and the pumping torque; determining a base torque from the net torques of the plurality of cylinders, wherein the base torque is a minimum of the torque adjustments of the plurality of cylinders; determining a torque adjustment for each of the plurality of cylinders as a function of the net torque for the cylinder and the base torque; and controlling a torque output of each of the plurality of cylinders includes adjusting an electrical load of each of the plurality of cylinders in response to the torque adjustment of the cylinder.

7. A method, comprising: operating an internal combustion engine having a plurality of cylinders; determining an indicated torque for each of the plurality of cylinders as a function of a speed of the internal combustion engine, a fraction of exhaust gas in a charge flow to the cylinder, a nominal spark timing of the cylinder, and an air amount in the cylinder; determining a pumping torque for each of the plurality of cylinders as a function of the speed of the internal combustion engine, an intake manifold pressure of the cylinder, and an exhaust manifold pressure of the cylinder; determining a net torque for each of the plurality of cylinder from a difference between the indicated torque and the pumping torque; determining a base torque from the net torques of the plurality of cylinders, wherein the base torque is a minimum of the torque adjustments of the plurality of cylinders; determining a torque adjustment for each of the plurality of cylinders as a function of the net torque for the cylinder and the base torque; and controlling a torque output of each of the plurality of cylinders includes operating a motor connected to the internal combustion engine in response to the torque adjustment of the cylinder.

\* \* \* \* \*